(12) United States Patent
Geffen et al.

(10) Patent No.: US 8,553,872 B2
(45) Date of Patent: *Oct. 8, 2013

(54) METHOD AND SYSTEM FOR MANAGING A QUALITY PROCESS

(75) Inventors: David Geffen, Givat Shmuel (IL); Yoav Freiberger, Tel Aviv (IL); Yoel Goldenberg, Closter, NJ (US)

(73) Assignee: Nice-Systems Ltd., Ra'anana (IL)

( * ) Notice: Subject to any disclaimer, the term of this patent is extended or adjusted under 35 U.S.C. 154(b) by 761 days.

This patent is subject to a terminal disclaimer.

(21) Appl. No.: 12/499,210

(22) Filed: Jul. 8, 2009

(65) Prior Publication Data

US 2011/0007889 A1  Jan. 13, 2011

(51) Int. Cl.
*H04M 3/00* (2006.01)
(52) U.S. Cl.
USPC ................................. 379/265.06; 379/265.01
(58) Field of Classification Search
USPC ............... 379/265.01–265.14, 266.01–266.1, 379/309
See application file for complete search history.

(56) References Cited

U.S. PATENT DOCUMENTS

| | | | |
|---|---|---|---|
| 6,882,723 B1* | 4/2005 | Peterson et al. | 379/265.01 |
| 8,078,486 B1* | 12/2011 | McLean et al. | 705/7.14 |
| 2002/0019765 A1* | 2/2002 | Mann et al. | 705/11 |
| 2002/0196277 A1* | 12/2002 | Bushey et al. | 345/745 |
| 2005/0027858 A1* | 2/2005 | Sloth et al. | 709/224 |
| 2006/0262922 A1* | 11/2006 | Margulies et al. | 379/265.12 |
| 2007/0192157 A1* | 8/2007 | Gooch | 705/9 |
| 2007/0198329 A1* | 8/2007 | Lyerly et al. | 705/11 |
| 2007/0198330 A1* | 8/2007 | Korenblit et al. | 705/11 |
| 2008/0181389 A1* | 7/2008 | Bourne et al. | 379/265.06 |
| 2008/0208644 A1* | 8/2008 | Gray et al. | 705/7 |

* cited by examiner

*Primary Examiner* — William Deane, Jr.
(74) *Attorney, Agent, or Firm* — Pearl Cohen Zedek Latzer, LLP

(57) ABSTRACT

Embodiments of the invention are directed to a computer-implemented method of performing a quality evaluation. The method may include selecting from a plurality of interaction recordings at least one interaction recording according to at least one KPI. The method may include associating a selected interaction recording with a predefined evaluation form, presenting interactions selected for evaluation to an evaluator and performing a predefined action based on a result of the evaluation.

16 Claims, 9 Drawing Sheets

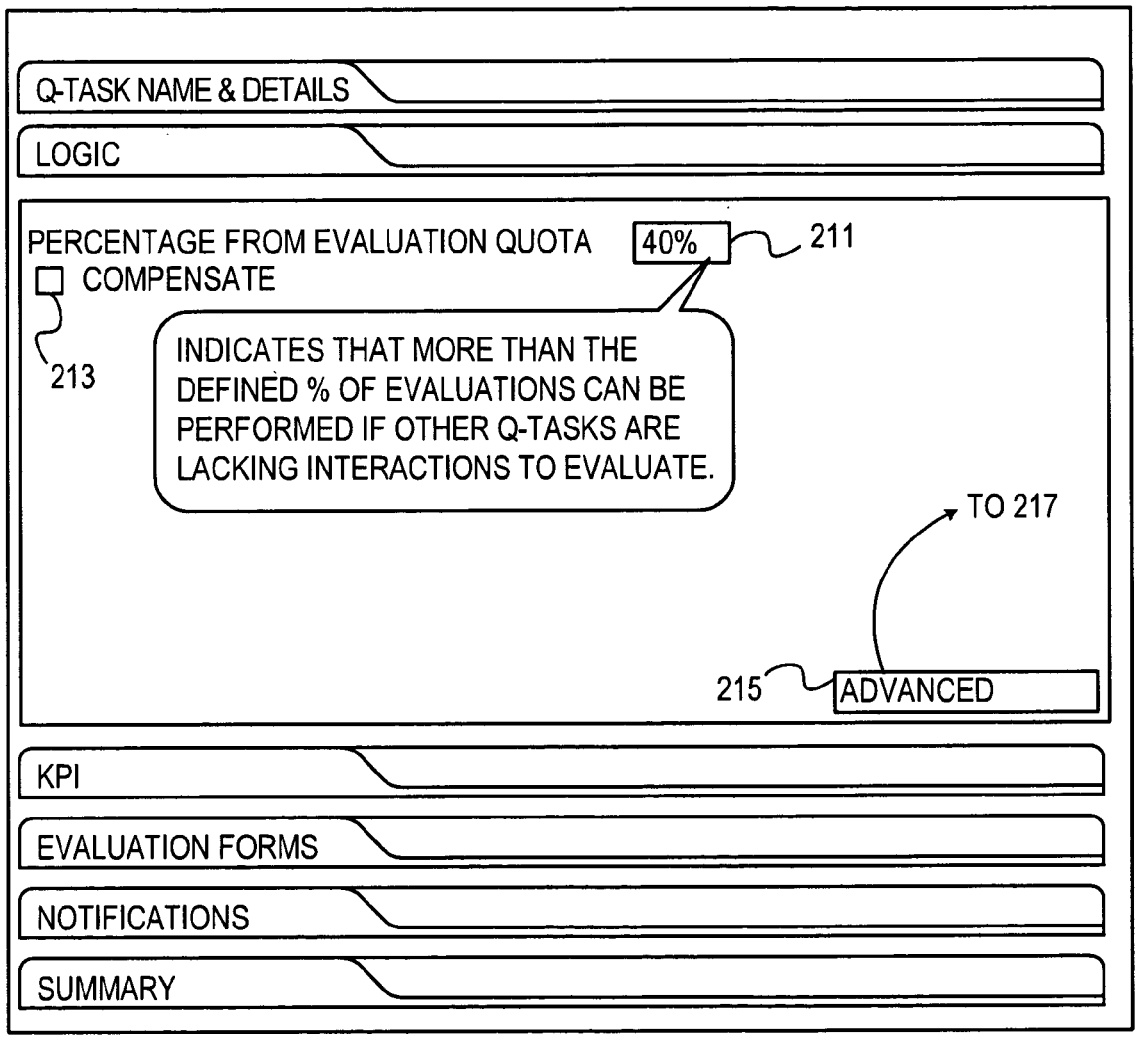

FIG. 2B-II

FROM 215

217

ADVANCED

INTERACTION SELECTED FOR EVALUATION [10] DAYS — 219
SHOULD BE SELECTED FROM THE LAST:

APPLIES TO BUSINESS Q-TASKS

INTERACTIONS SHOULD BE SELECTED [10] DAYS — 220
EVERY

☐ ENABLE AUTOMATIC REPLACEMENT OF INTERACTIONS BASED ON KPI SEVERITY
— 221

☐ DUE DATE FOR COMPLETING EVALUATION [10] DAYS

BY OTHER QM WHO SHARE THE Q-PLAN

NUMBER OF CALIBRATIONS TO PERFORM: [10]
222
223

INTERACTION ASSIGNMENT
⊙ INTERACTIONS OF A SINGLE AGENT ARE RANDOMLY DISTRIBUTED AND ASSIGNED TO A QM
○ INTERACTIONS OF A SINGLE AGENT ARE EVENLY DISTRIBUTED BETWEEN QM
○ A SINGLE QM IS RESPONSIBLE FOR THE ENTIRE INTERACTIONS OF A SINGLE AGENT
— 224

QUALITY HISTORY

APPLIES TO STANDARD Q-TASKS ALONE.

[FILTER]

☑ ABOVE: [80]   AND UNDER: [100]   225   DO – [80%]
☑ ABOVE: [60]   AND UNDER: [80]         DO – [100%]

PERIOD FOR HISTORICAL QUALITY SCORE [10] DAYS   226
CALCULATION:
227

( ADD )  ( DELETE )

SENIORITY                 — 228

☑ ABOVE: [1] [MONTHS▼] AND UNDER: [3] [MONTHS▼] DO – [80%]
☑ ABOVE: [3] [MONTHS▼] AND UNDER: [6] [MONTHS▼] DO – [100%]

( ADD )  ( DELETE )

Q-TASK DEFINITION

- Q-TASK NAME & DETAILS
- LOGIC
- KPI
- EVALUATION FORMS
- NOTIFICATIONS

| NAME | TYPE | DESCRIPTION | ACTIVE |
|---|---|---|---|
| LOW EVAL SCORE | | EVALUATION SCORE | ☐ |
| HIGH EVAL SCORE | | EVALUATION SCORE | ☐ |
| EVAL DUE DATE | | DUE DATE | ☐ |

— 248

— 250   [DELETE] [NEW] [EDIT]

OPEN Q-TASK NOTIFICATION DEFINITION

- SUMMARY

251

Q-TASK NOTIFICATION DEFINITIOIN

NOTIFICATION NAME — TRANSFER RATE(%) EVALUATION SCORE
NOTIFICATION DESCRIPTION
252

NOTIFICATION TYPE — Q-TASK INITIATION ▼ — 253
DUE DATE EXPIRATION

NOTIFICATION DISTRIBUTION
255 { ☐ EVALUATOR MANAGER   [SELECT USERS]
     ☐ GROUP MANAGER
     ☐ AGENT        258   256   258

ROLE BASED AND A 'FIXED' LIST OF USERS ARE SUPPORTED.

NOTIFICATION CONTENT   ☐ OPEN CONTENT   ☐ PREDEFINED CONTENT

AN INTERACTION EVALUATED BY [EVALUATOR NAME] HAS RECEIVED A RESULT BELOW 60 [EVALUATION SCORE]
TO VIEW THE INTERACTION PLEASE FOLLOW THE LINK 257   249

FIG. 2E

METHOD AND SYSTEM FOR MANAGING A QUALITY PROCESS

BACKGROUND

Many companies, businesses or organizations operate or use a centralized communication center, such as a call center or a contact center to handle incoming and outgoing interactions with clients, customers, constituents, members or users. For example, government agencies, health care facilities, companies and/or businesses which may include telemarketing methods, product services, debt collection and customer support.

Quality management of contact or call centers is recognized as a valuable tool for maintaining and increasing performance, efficiency and productivity, among other aspects, of such facilities. Various operational or other aspects of a call center may be relevant to a quality management and evaluation process. For example, customer experience and/or satisfaction, calls duration, outcome or other parameters, number of interactions per a time period may all be relevant to the control, assurance and/or improvement of quality and accordingly, to quality management.

Typically, quality management comprises evaluating calls or interactions. For example, a quality manager or supervisor may replay a recording of a call held between an agent and a customer and evaluate the call, possibly taking into account parameters such as the outcome of the call, the duration of the call, the level of satisfaction of the customer and so on.

However, currently, a quality manager or supervisor may be required to select calls for evaluation. Selecting calls as done today may be time consuming and ineffective to list some drawbacks. For example, selecting calls for evaluation from thousands of recorded calls held by dozens of agents may be an overwhelming task for a quality manager. Accordingly, a quality manager may randomly select interactions to be evaluated. However, randomly selecting interactions or calls for evaluation may severely limit or reduce possible benefits of an evaluation and a related quality management.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2A-2E are exemplary depictions of portions of a computer screen showing an exemplary graphical user interface helpful in performing embodiments of the present invention;

Figure 1:
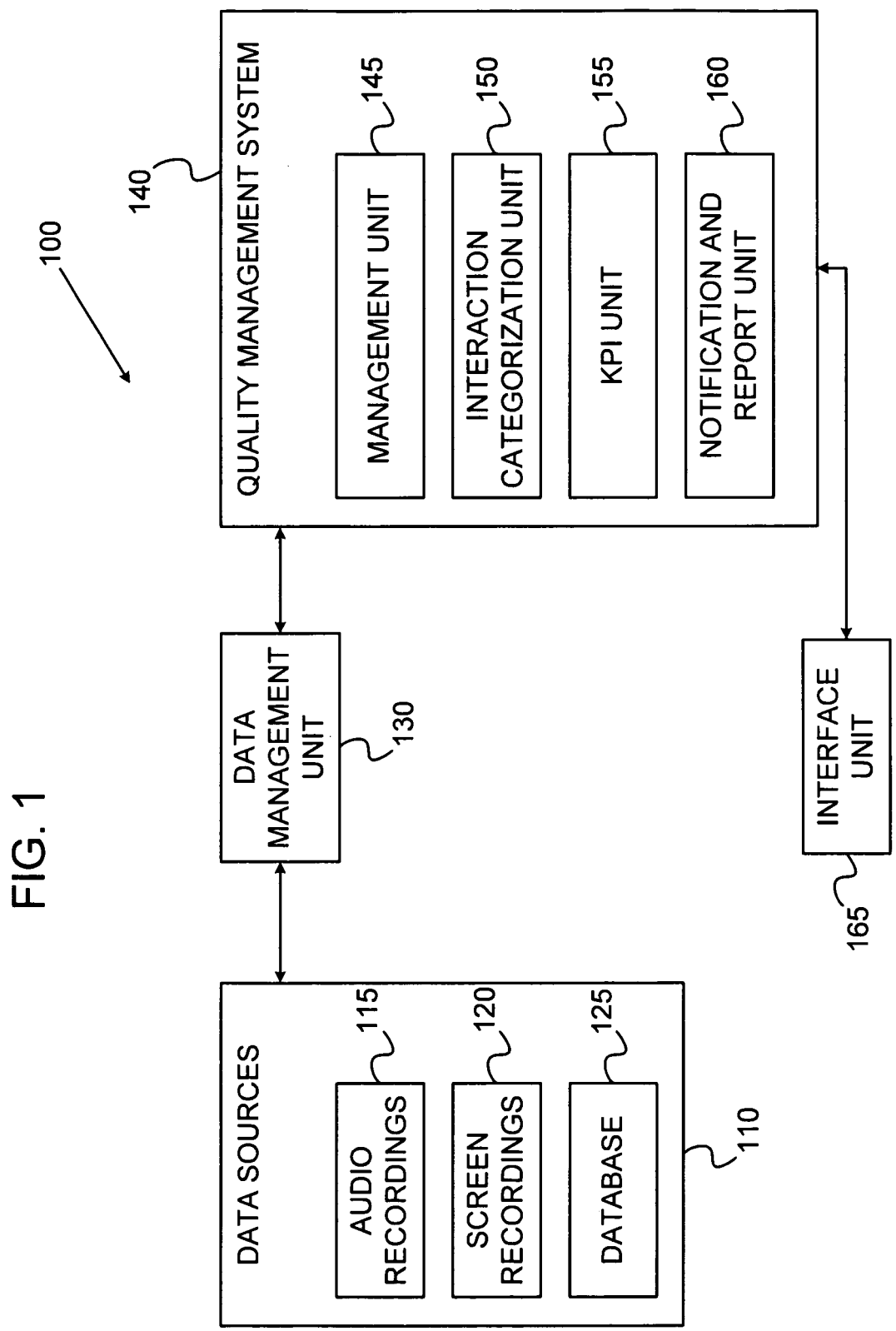
FIG. 1 is an exemplary block diagram of a quality management system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of devices" may include two or more devices.

Although embodiments of the invention are not limited in this regard, the term "contact center" as used herein may be used throughout the specification and claims to describe any centralized or distributed locations used for collective handling of multi-media information, for example, telephone calls, faxes, e-mails and the like, or any other centralized or distributed locations used for the purpose of receiving, transmitting and controlling a large volume of information.

Although embodiments of the invention are not limited in this regard, the terms "call", "session" and/or "interaction" as used herein may be used throughout the specification and claims to describe a communication session between two or more humans or components, for example, a call or interaction may involve a device or component of a recording environment such as, VoIP telephone call, an instant messaging session, computer screen data, chat, video conference or any other multi-media session or interaction in a multi-media communication environment. Although embodiments of the invention are not limited in this regard, the terms "quality manager" and/or "quality supervisor" as used herein may be used throughout the specification and claims to describe a person who is assigned the task of evaluating interactions. For example, a quality manager may replay recorded calls and provide an evaluation or appraisal of the agent involved in such calls. The term "agent" may refer to any person who is assigned the task of interacting with customers, clients or others who may call or otherwise interact with the relevant organization, facility, institution or business.

As described herein, a quality manager may currently select calls or recorded interactions for evaluation. Selected calls may be replayed and evaluated by the quality manager and a score may be associated with the evaluated interaction and/or the relevant agent. Currently, the quality manager may randomly select calls or may select calls associated with a specific agent or a specific time etc. In order to select interaction related to a specific time period, a quality manager may be required to obtain and execute various queries to a database or repository. However, combining a number of criteria for a selection may be extremely complicated if not impossible. For example, a quality manager has no feasible or practical way of selecting for evaluation calls that were handled by a specific agent, during a specific time period, where the calls were further related to a specific campaign and comprised specific words or terms. Furthermore, adapting the process of selecting interactions for evaluations to changing needs, objectives or goals of an organization may currently be an overwhelming task. Such task may be made simple and easy and possibly automated by embodiments of the invention.

As described herein, embodiments of the invention may enable automatically selecting calls for evaluation based on any number of parameters, indications, rules, thresholds, criteria, settings, configuration, context, aspects or any other applicable data or information. As described herein, a quality plan may define any applicable parameters for selecting calls or interactions for evaluation. Embodiments of the invention may enable defining various quotas. For example, a quota may define the number of calls related to a specific agent or group of agents that need to be evaluated per day, month or other time period. A quota may be related to a quality manager, e.g., the number of evaluations a specific quality manager is to perform per day or other time period.

In contrast to current practice whereby a quality manager is required to search for and retrieve calls for evaluation ("pull" mode of operation), e.g., by querying a database, embodiments of the invention may enable providing the quality manager with the selected recordings ("push" mode of operation). Embodiments of the invention may associate a specific evaluation form with a specific set of selected calls. As known in the art, evaluating a call may be according to various parameters. For example, evaluating a call related to selling a product may comprise determining whether a product was actually sold while evaluating a call related to support may comprise determining if a problem presented by the client was solved. As described herein, automatically associating an evaluation form with a call to be evaluated may aid a quality manager in performing efficient evaluation of calls.

Reference is now made to FIG. 1, which is a block diagram of an exemplary system 100 according to embodiments of the present invention. It should be understood to a person skilled in the art that the architecture of the exemplary system described herein does not limit the scope of the invention and embodiments of the invention may be implemented in other systems. System 100 may comprise data sources 110. Data sources 110 may comprise various data sources, e.g., audio recordings 115, screen recordings 120 and database 125. Any applicable data source may be included in data sources 110, for example, a recording server or any other storage device or system. It should be understood to a person skilled in the art that data sources 110 are exemplary data sources and any other data source that may provide data related to interactions or data of interactions with customers or clients may be considered as a data sources 110.

Data management unit 130 may be operatively coupled to data sources 110 and may include any data, information, logic and/or applications required in order to locate, retrieve, manage or otherwise manipulate data or information in data sources 110. For example, data management unit 130 may maintain metadata as known in the art. As known in the art, metadata may enable searching for information objects by inspecting their related metadata. For example, metadata associated with a recording of a call may indicate when the call was held, the agent who handled the call, an outcome of the call etc.

It will be understood by those skilled in the art that any applicable data, parameters or other information may be stored as metadata or other type of data and utilized by data management unit 130 or other components of system 100. For example, during a progress of a call or upon termination of a call various parameters may be recorded, e.g., agent identification, call duration, call outcome etc. Such or other parameters may be obtained automatically by various systems or applications or may be obtained otherwise, e.g., by having the agent log various aspects of the call, for example, the outcome of the call, e.g., a product was sold. Any applicable information thus or otherwise obtained may be maintained by data management unit 130 and may further be used, for example, in order to select calls for evaluation as described herein.

Possibly in conjunction with other components of system 100, quality management system 140 may execute and manage a quality process. Quality management system 140 may enable a user to define various aspects of a quality process, e.g., a quality plan and/or a quality task as described herein. Quality management system 140 may be or may comprise a computing device that may be an off-the-shelf, custom made or dedicated device. Quality management system 140 may comprise software, firmware, hardware or any combination thereof. As shown by FIG. 1, quality management system 140 may include a number of units. Management unit 145 may be related to a definition, execution and management of a quality process. For example, a definition, execution and management of a quality plan or quality task described herein. Management unit 145 may coordinate operations involving other components or units in quality management system 140. Management unit 145 may interact with components outside quality management system 140. For example, actions performed upon termination of a quality process or procedure may be initiated by management unit 145. For example, if a coaching package is to be executed for an agent as a result of a quality procedure, management unit 145 may initiate, trigger or otherwise activate such package. It will be noted that while quality management system 140 may be a computing device and include components such as memory, controller and input/output devices or interfaces, these components were omitted for the sake of simplicity and clarity.

Management unit 145 may be related to a categorization of interactions. For example, management unit 145 may enable a user to define interactions categories by providing various parameters that may be used to determine if a call belongs to one or more categories. Key performance indicators (KPI) unit 155 may be related to any applicable aspect of KPI processing as known in the art. For example, KPI unit 155 may enable a definition of new KPIs and/or implementing KPI related procedures, e.g., determining if a KPI was breached or violated or a threshold was exceeded. Notification and report unit 160 may be related to providing any applicable information to any applicable recipient list as known in the art. Notification and report unit 160 may provide indications, warnings, alerts or any other suitable information. Such information may be provided to a management personnel, a supervisor or other configured recipients.

Interface unit 165 may be or may include any suitable interface device. For example, a display, keyboard, mouse or a computing device operatively connected to quality management system 140 and configured to support human or other interfaces. It will be recognized that interface unit 165 may interface with computing devices and/or human operators or users. While for the sake of simplicity a single exemplary interface unit 165 is shown, it will be noted that any applicable number of interface units may be utilized. For example, a first interface unit may serve an agent in a call center while a second interface unit similar to unit 165 may serve a quality manager and a third such unit may serve management personnel.

Embodiments of the invention may be preconfigured before being delivered to a client, for example, by NICE Ltd of ra'anana Israel. Alternatively or additionally, embodiments of the invention may be configured to meet the specific needs, requirements or other aspects of a specific site or facility. For example, an administrator or user may define and/or configure entities such as, but not limited to, quality plans, quality tasks, KPIs and interactions categories all of which described in further details herein.

According to embodiments of the invention, an administrator or user may define interactions categories. Simple categories may be defined, for example, "sales" and "support" may be two simple interactions categories. Complex categories may also be defined using any applicable parameters, rules, thresholds, criteria or other applicable aspects. For example, an interaction category may include calls related to support that lasted more than five minutes and were held during a weekend. Other exemplary categories may be related to a specific customer, e.g., a category may be defined to only include calls from an important customer or a category may include all interactions that included a specific word or phrase, possibly as detected by word spotting techniques known in the art. Multi dimensional analytics parameters or results including, e.g., customer feed back, emotion detection, talk analysis, business transactions history, customer preferences, screen events and/or call flow parameters such as call duration, ring time, average holding time may all be used to define an interaction category. An administrator may use interface unit 165 to interact with management unit 145 to define and store such categories in system 100.

According to embodiments of the invention, an administrator or user may define one or more KPIs and associate such KPIs with an interaction category defined as described herein. As further described herein, one or more KPIs may be associated with a quality task and/or a quality plan. Simple KPIs may be defined, for example, "call longer than ten minutes" and "call resulted a sale" may be two simple KPIs. Complex KPIs may also be defined using any applicable parameters, rules, thresholds, criteria or other applicable aspects. For example, a KPI may be related to a number of transfers made in a call, various screen related activities performed by an agent, e.g., the pressing of specific graphical objects as monitored by NICE Screen Sense™, a duration of a call, a time an agent took for completing an online form, or a First Call Resolution (FCR) as known in the art. Multi dimensional analytics parameters or results including, e.g., customer feed back, emotion detection, talk analysis, business transactions history, customer preferences, screen events and/or call flow parameters such as call duration, ring time, average holding time may all be used to define KPIs. According to embodiments of the invention, a KPI definition may be related to various parameters or associations. For example, a KPI definition may be related to an interaction category, e.g., a KPI defined as an average holding time (AHT) may further define a first threshold for an interaction category of "sales", e.g., seven minutes, and a second threshold for interaction category of "support", e.g., three minutes. Similarly, a KPI may be differently applied to different agents, days of a week, time of day, sums of money etc. An administrator or user may use interface unit 165 to interact with KPI unit 155 to define and store KPIs in system 100.

According to embodiments of the invention, an administrator or user may define one or more quality task. A quality task may be viewed as an associated collection of KPIs, logic, actions, evaluation forms, parameters, thresholds, criteria, settings, configuration, context, aspects or any other applicable data or information. Reference is now made to FIGS. 2A-2E which are exemplary depictions of portions of a computer screen showing an exemplary graphical user interface helpful in performing embodiments of the present invention. FIGS. 2A-2E present a plurality of graphical views of computer screens which may be used to define a quality task. For example, interface unit 165 may display, on a display screen objects shown in FIGS. 2A-2E and a user operating interface unit 165 may use such screens to define or modify a quality task.

Figure 2A:
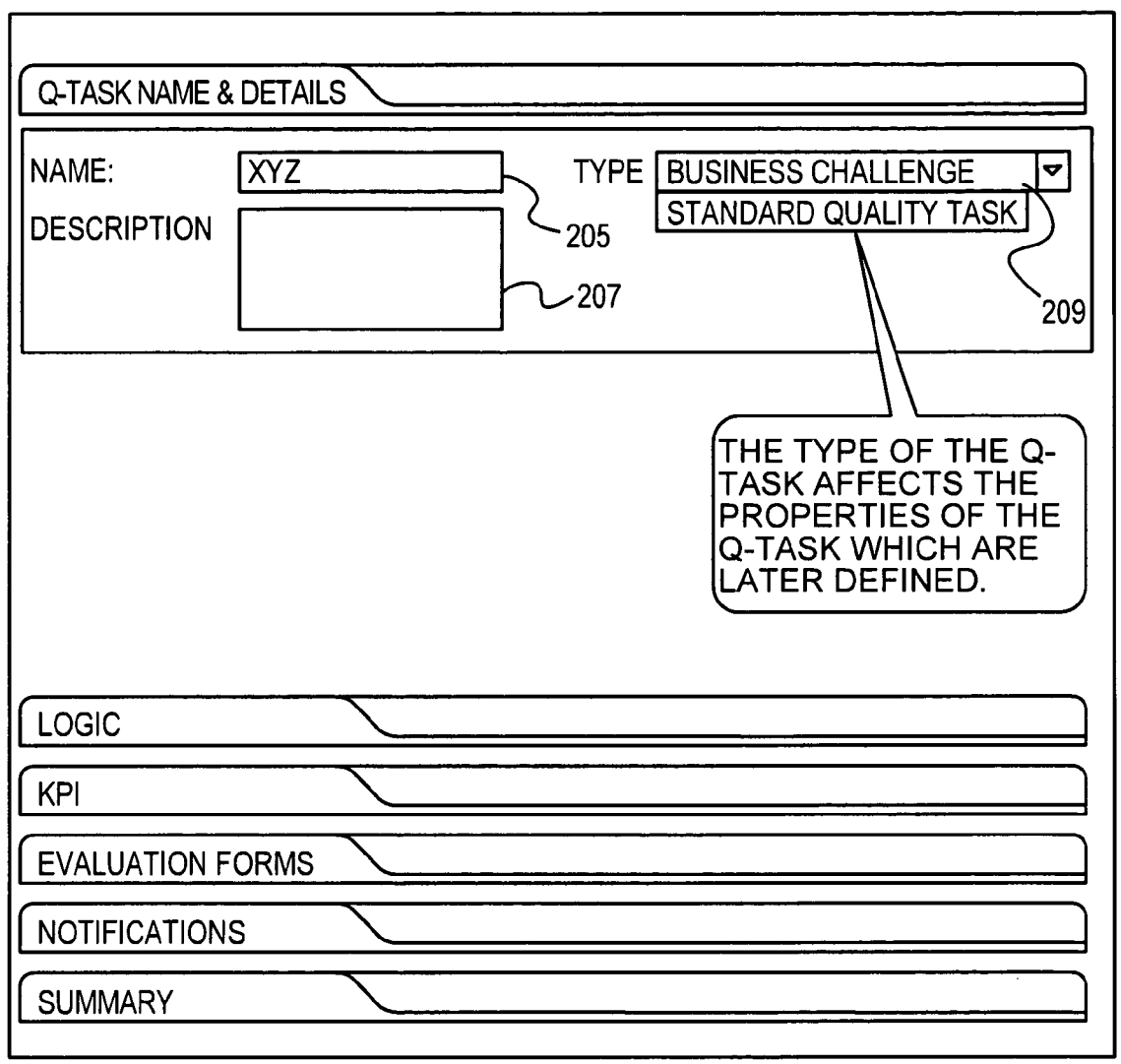

Referring to FIG. 2A, a user may assign a quality task a name as shown by 205. As shown by 207, a user may associate a quality task with a free format description. As shown by 209, a user may determine a type of a quality task. For example, a "standard" quality task may be one that is executed automatically or periodically while a business challenge quality task may be executed upon detecting various conditions, e.g., a breach of an associated KPI. As shown by FIG. 2B, a user, for example, of system 100, may define various aspects of a quality task's logic. Some exemplary configurable parameters related to a logic of a quality task are shown in FIG. 2B.

According to embodiments of the invention, a number of quality tasks may be associated with a single quality plan. Accordingly, the total number of evaluations defined by a quality plan may be shared by the associated quality tasks. For example, as shown by 211, a user may define a relative load share of a quality task related to the total or overall load defined by an associated quality plan. For example, a quality task may be assigned forty percent (40%) of the overall load. As shown by 213, a user may configure a quality task to compensate for other quality tasks. For example, if two quality tasks are associated with the same quality plan then if a first quality task is unable to meet its quota or percentage, a second quality task may compensate by performing more than its share. When compensation is considered, box 211 may define the additional load to be handled by the quality task. For example, a fifty percent (50%) in box 211 may define that the quality task may compensate for other quality tasks by exceeding its share by fifty percent (50%).

As shown by 215, various advanced parameters related to a quality task may be configured. Some advanced options or configurations are shown by block 217. As shown by block 219, a time window may define that interactions selected for evaluations will be from a predefined historical period, for example, the last ten days. As shown by block 220, an interval for selecting interactions for evaluation may be defined, e.g., select interactions for evaluation every ten days. As shown by block 221, a user may define that selected interactions may be replaced. For example, a previously selected for evaluation interaction may be automatically replaced if, based on a breaching of a KPI, another interaction may be selected and the severity of the KPI breaching is greater than the one of the already selected interaction.

As shown by block 222, a due date for completing defined evaluations may be configured, for example, a time period of ten days from the selection of interactions may be configured. As described herein, failing to comply with configured parameters as described herein may result a notification being generated and delivered to a predefined recipient list. For example, a quality manager's failing to complete evaluating a predefined quota of interactions by a due date defined as shown by block 222 may cause system 100 to generate an alert, warning or indication and provide such indication to the quality manager, his superiors or other configured recipients of such indication.

As shown by block 223, the number of calibrations to perform may be defined. Typically, a calibration process may involve evaluating a call by more than one evaluator in order to maintain consistency of evaluation criteria and scores. A proper evaluation is required to be indifferent or unrelated to the evaluator, accordingly, having more than one evaluator evaluate a call may expose undesirable differences that may be related to the personnel performing evaluations. Number of calibration as shown by block 223 may enable configuring the portion of a quality manager's quota that will reevaluated for calibration purposes.

As described herein, a number of quality tasks may be associated with a quality plan. A quality plan may be associated with a number of quality managers or supervisors who's tasks or duties may include evaluating interactions. Accordingly and as shown by block 224, a user of system 100 may define a distribution logic of interactions evaluations.

For example and as shown, a user may configure system 100 to randomly distribute interactions related to a specific agent between a number of quality managers, or evenly distribute calls related to a specific agent between a number of quality managers. Alternatively and as shown, interactions related to a specific agent may be evaluated by a specific quality manager. It will be noted that other distribution logics may be supported by embodiments of the invention.

According to embodiments of the invention, a historical quality score may be computed. For example, a score may be computed for all or some of the interactions that took place in the past week. A historical quality score may be used as a selection criterion. For example, a user may configure system 100 to select interactions for evaluation based on a computed historical score. For example and as shown by block 225 and 226, a user may configure system 100 to select eighty percent (80%) of calls associated with a historical score that is above eighty (80) and below one hundred (100) and select all (100%) of interactions associated with a historical score that is above sixty (60) and below eighty (80). As shown by block 227, a period with which a historical score is associated may be configured.

Yet another criterion that may be used for selection of interactions for evaluation may be the seniority of the relevant agents. Accordingly and as shown by block 228, system 100 may be configured to select interactions for evaluation based on the seniority of the associated agents. For example and as shown, a user may cause system 100 to select more interactions associated with agents of a seniority of three to six months than interactions associated with agents of a seniority of one to six months.

Figure 2C:
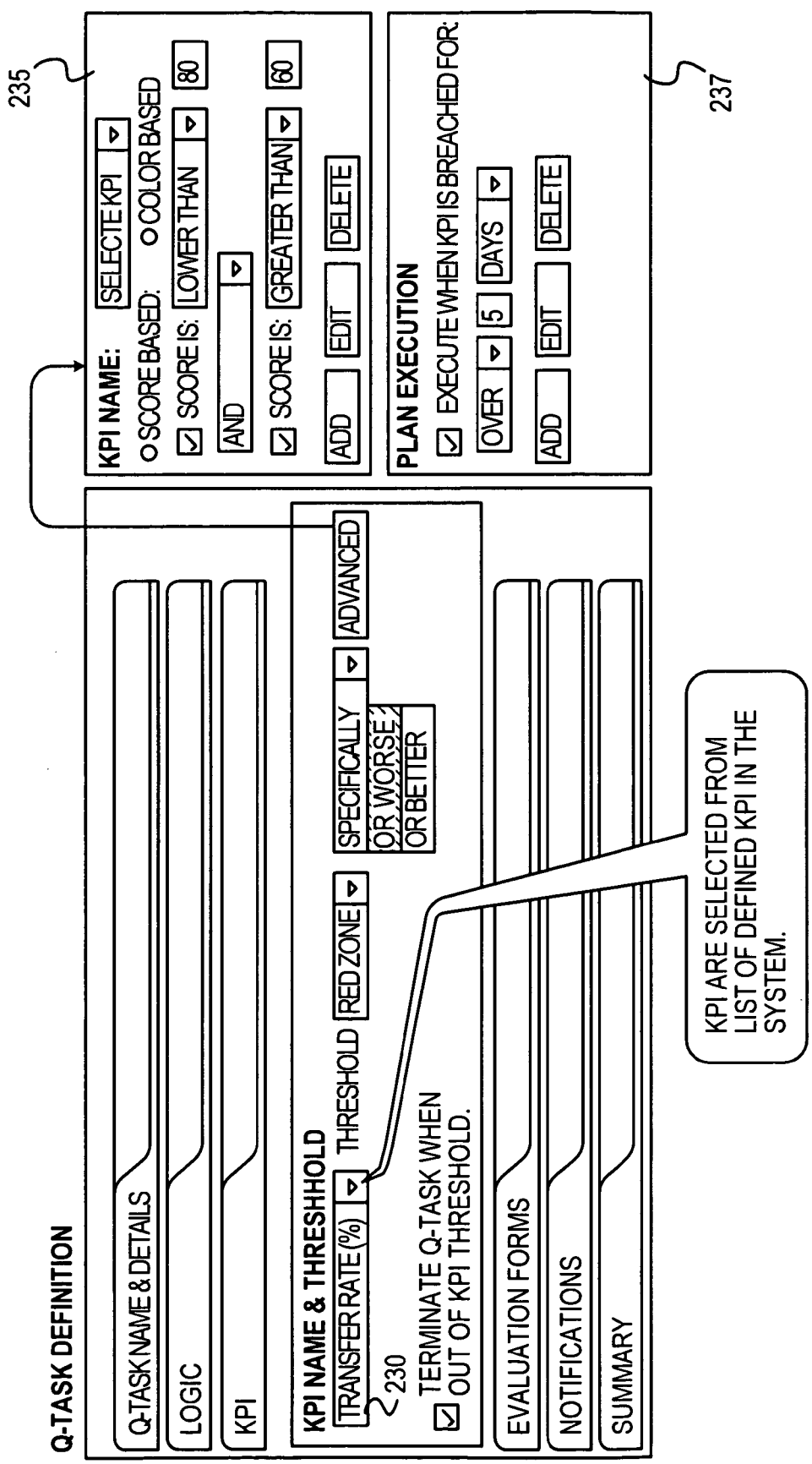

According to embodiments of the invention, one or more KPIs may be associated with a quality task. Referring to FIG. 2C and as shown by block 230, a user may select a KPI to be associated with a quality task. As shown by block 235, association of a KPI with a quality task may be according to a number of parameters, thresholds and/or conditions. For example, as shown by block 235, a user may configure system 100 to select interactions associated with a score lower than eighty and greater than sixty where the score is the one defined by the KPI.

According to embodiments of the invention, a quality task may be automatically activated or invoked. For example, a quality task may be activated upon detecting conditions involving a breaching of a KPI. Accordingly and as shown by block 237, a user may configure a quality task to be activated upon a breaching of an associated KPI. As shown, a user may define a time period during which the KPI was breached. For example, activate the quality task if the KPI was breached for more than five days. As shown, other conditions may be added using an "Add" button, likewise and as shown, conditions may be removed or modified.

According to embodiments of the invention, an evaluation form may be associated with a quality task. Such associated evaluation form may be provided to a quality manager who may use the evaluation form to evaluate an interaction. An evaluation form may be designed according to the specific category of the interaction. An evaluation form may be designed in relation to the quality task, the relevant KPI or any applicable parameters. For example, an evaluation form may be designed for a specific campaign, a specific group of agents, a specific business objective, e.g., increasing upsells or improving support service, possibly for a specific product.

Figure 2D:
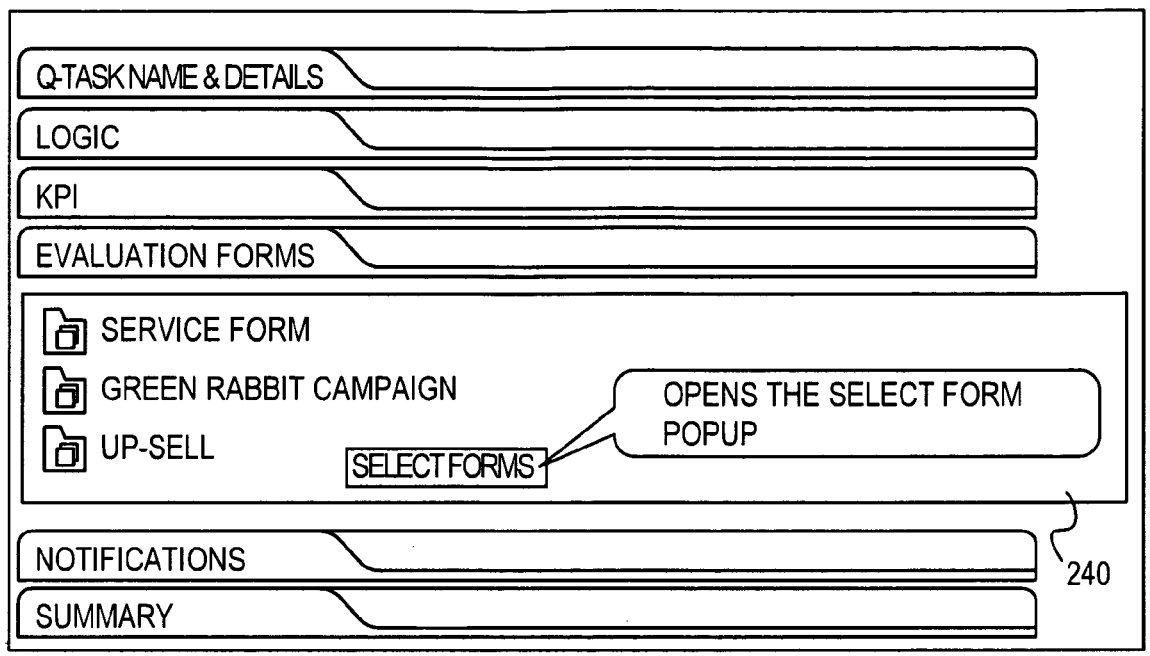

Such preconfigured evaluation forms may help a quality manager to focus on the most relevant aspects of an interaction being evaluated. For example, the quality manager may follow items in the evaluation form, e.g., by checking boxes or filling notes were required and based on instructions in the evaluation form. Referring to FIG. 2D and as shown by 240, a user may select to associate an evaluation form with a quality task.

According to embodiments of the invention, any applicable warning, report or notification may be generated and provided, possibly to a preconfigured list of recipients or designated personnel, staff or users. Specifically, warnings, reports or other indications may be generated based on a result or outcome of an evaluation. For example, an evaluation score below a predefined threshold may cause system 100 to generate an indication and provide such indication to a manager or other person in charge. Alternatively or additionally, embodiments may log, record, store or otherwise save an indication or report and further enable reviewing such indications or reports at a later stage.

Reference is now made to FIG. 2E. As shown by block 250, an operator may configure indications generation and distribution. As shown by 248, a notification may be marked as active by checking the appropriate check box. As shown by 249, a user may define a new indication to be associated with a quality task. According to embodiments of the invention, parameters or aspects such as a name of the indication, a description, a type, a distribution list and the content of the notification may be defined and/or configured by a user or operator, for example of system 100. As shown by block 251, a name may be assigned to an indication. As shown by block 252, a description may be associated with an indication. As shown by block 253, a type may be configured. Any applicable type may be configured for an indication. An indication type may affect various aspects and/or logic of the indication. For example, a type related to due date may cause an indication to be generated when a due date for the relevant event or action is violated.

For example, a quality manager failing to perform or meet his quota of evaluations by a defined date may cause an indication to be generated and possibly delivered to his superiors. Accordingly, an indication type related to an evaluation score may be generated when a score lower than a predefined threshold is detected. As shown by 255, a distribution list may be configured. As shown, one or more predefined distribution lists or groups may be selected by checking an appropriate check box. As shown by 256, a list of personnel, e.g., managers, agents or others may be opened and any member in such list may be selected to receive an indication as described. Any form, method or means for delivering an indication may be employed by the invention. For example, an indication may be provided by electronic mail, by causing a popup message to be displayed on a computing device, e.g., a computing device associated or operated by the intended recipient or using short message service (SMS) to deliver the indication to a mobile telephone or other device. As shown by 257, a content of an indication may be configured, drafted or modified. For example, any free format text may be entered and such text may be delivered upon delivering an indication as described herein. As shown by 258, a user may select predefined content or open content, e.g., free format to be delivered with the indication.

According to embodiments of the invention, a quality plan may combine, contain, include or incorporate various parameters, aspects and definitions of a quality process. For example, a quality plan may be associated with one or more quality tasks, KPIs, agents or agents groups, quality managers, indications etc. A quality plan may enable defining and executing a quality process according to various goals, objectives or levels. For example, a quality plan may be defined for a specific goal such as increasing efficiency of agents or an agent group, measuring or monitoring a commercial or other campaigns, replacement of a predefined percentage of a work force etc. A quality plan may target a number of related goals or a combination of business or other objectives. For example, a quality plan may be directed at increasing upsells of a specific product during a specific time of day or day of week, e.g., evenings on weekend days.

Figure 3:
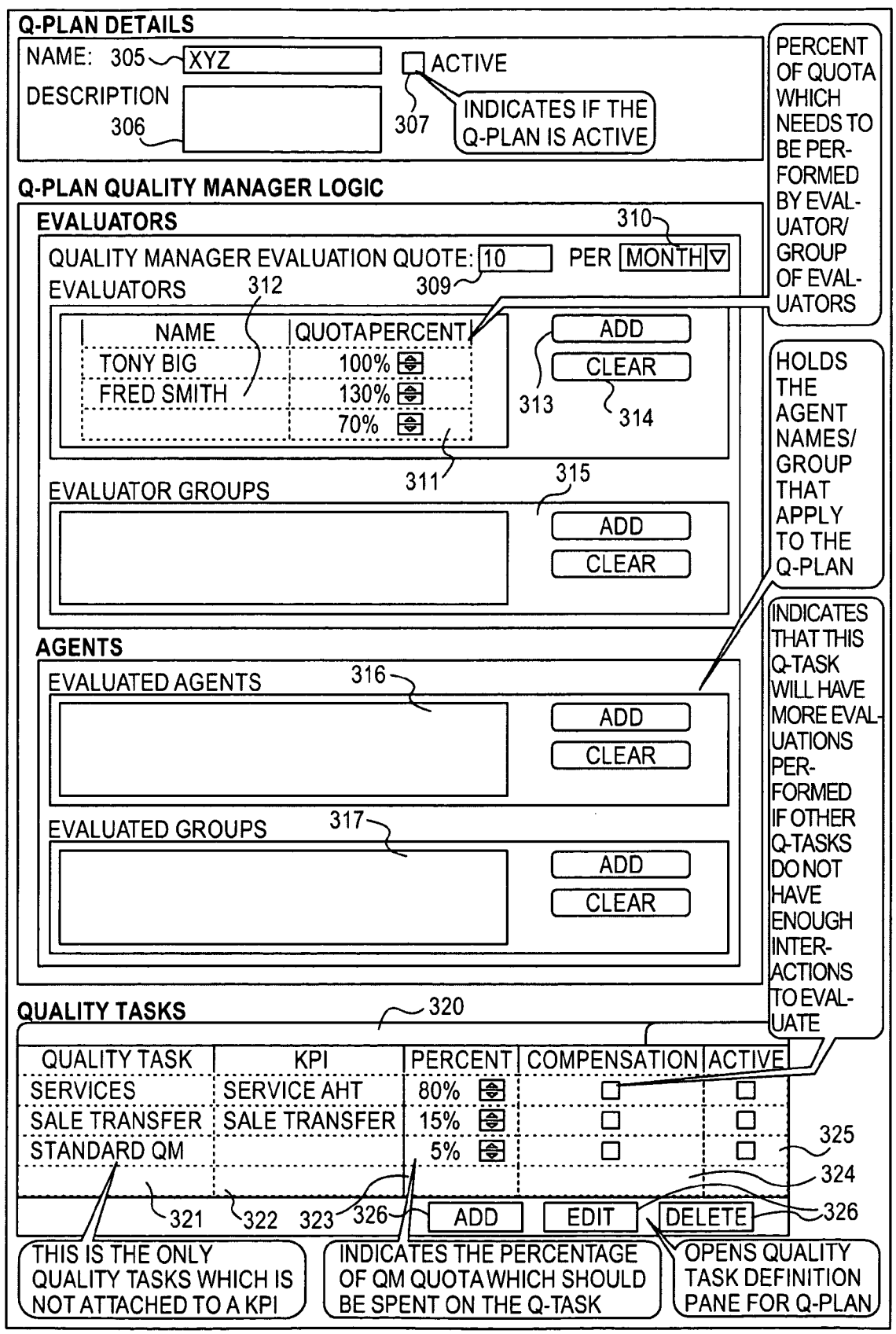
FIG. 3 is and exemplary depiction of portions of a computer screen showing an exemplary graphical user interface helpful in performing embodiments of the present invention.

Reference is now made to FIG. 3 which is an exemplary depiction of a computer screen showing an exemplary graphical user interface helpful in performing embodiments of the present invention. The screen shown by FIG. 3 may be used to configure a quality plan. As shown by block 305, a name may be assigned to a quality plan. A quality plan may be referred to or located by its name. As shown by block 306, a user may provide a description of a quality plan, such description may be saved with other parameters defining the quality plan and may be helpful, for example, in explaining the purpose or other aspects of the quality plan to other users.

As shown by block 307, a quality plan may be made active. When marked as active as shown by block 307, a quality plan may execute as described herein, otherwise, a quality plan may be stored and saved, possibly to be used at a later time. As shown by block 309, a quota may be defined. A quota may be a number of evaluations to be performed by a group of quality managers, e.g., the quality managers listed as shown by 312. As shown by block 310, a time period related to a quota may be defined. For example, a time period of one month may be defined. Accordingly, a quota defined may be: 35 evaluations per one month. As shown by block 312, a list of quality managers or evaluators may be defined and associated with a quality plan. Quality managers listed as shown by block 312 may perform evaluations as defined by the quality plan. As shown by blocks 313 and 314, quality managers may be added to or removed from the list. As shown by block 311, a relative quota of each quality manager may be defined. Accordingly, a quality plan may assign different quotas or loads to respective different quality managers. As shown by 315, quality managers groups may be added rather than adding specific, single quality managers one by one.

As shown by 316, agents to be evaluated may be specified and/or listed. In one embodiments, only agents listed as shown by 316 may be evaluated. As shown by 317, groups of agents may be specified. For example, a call center may have a few agents groups defined, e.g., support group, sales group etc. Accordingly and as shown by block 317, an entire group of agents, e.g., the support group may be specified and such group may be evaluated according to the relevant quality plan. Any number of quality tasks described herein may be associated with a quality plan shown by block 320. As shown by 321, a name of an associated quality task may be displayed as well as other configurable parameters. As shown by 322, a KPI associated with the quality task may be displayed. As shown by 323, each quality task may be assigned a percentage of the overall load of the quality plan. For example and as shown, a first quality task may be assigned eighty percent (80%) of the total or overall load of the quality plan, a second quality task may be assigned fifteen percent (15%) while a third quality task may be assigned five percent (5%).

According to embodiments of the invention, a first quality task may compensate for other quality tasks. For example, if a first quality task fails to select its quota or percentage of interactions for evaluation then a second quality task may select more than its share thus compensate for the first quality task. As shown by 324, a user may configure a quality task to compensate for other quality tasks by checking the appropriate check box. For example, by checking the check box of the "services" quality task a user may cause the "services" quality task to select more interactions for evaluation than the allocated 80% in case other quality tasks, e.g., the "Sale transfer" or "Standard QM" fail to select their share. As shown by 325, quality tasks in a quality plan may be active or inactive. Such state may be configured by checking the appropriate check box. As shown by 326, quality tasks in a quality plan may be added, deleted or edited.

According to embodiments of the invention a quality process may be fully automated. For example, a predefined event may trigger an automatic process that may include automatically selecting interactions for evaluation where such selection is performed according to preconfigured criteria, rules, thresholds or other relevant parameters. The automated process may further provide a quality manager with the selected interactions. The process may monitor the actual evaluation performed by the quality manager and the associated results. The process may generate indications, alerts, warnings and/or reports based on the evaluation performed. Possibly after the evaluation is performed, the process may perform one or more preconfigured tasks based on an outcome or result of the evaluation process or the quality process itself.

Figure 4:
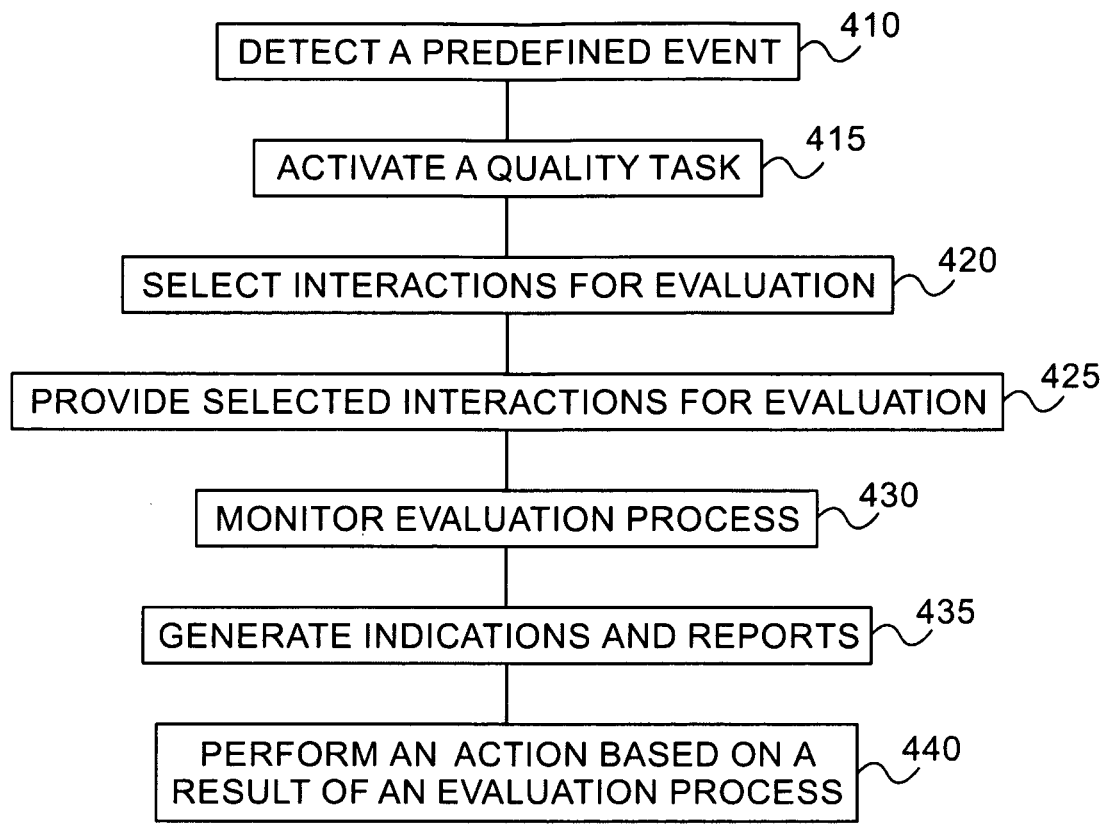
FIG. 4 shows an exemplary flowchart that may be used to implement embodiments of the invention.

Reference is made to FIG. 4 that shows an exemplary flowchart of a method that may be used to implement embodiments of the invention. As shown by block 410, the method may include detecting a predefined event. For example, a breaching of a KPI may be detected. For example, a KPI may define an average holding time (AHT). A quality plan as described herein may be associated with a KPI that defines a threshold. such definition may include a number of interactions that may exceed a predefined AHT over a predefined period of time, for example, 15% of the calls during a week. Accordingly, if such threshold is exceeded, e.g., more than 15% of the calls in the past week had an AHT above the predefined level, an associated quality task may be activated as described herein. Any method may be employed by embodiments of the invention to detect an event such as breaching of a KPI. For example, recorded interactions may be processed to detect various aspects or parameters such as call duration, predefined words or terms or a result of a call. Any such parameters may be associated with a KPI and processing interactions may comprise determining if an associated KPI has been breached. Alternatively or additionally, online monitoring may be employed to detect or derive various parameters such as call duration, word spotting etc. According to some embodiments, a quality task may be activated periodically, e.g., once a week or every three working days. Accordingly, a clock event indicating that a predefined period of time has elapsed, for example, since the quality task was last activated may be detected and cause an activation of the relevant quality task.

As shown by block 415, a quality task may be activated. As described herein, a predefined event as described with reference to block 410 and a quality task may be included in a quality plan. Accordingly, a quality plan may associate an activation of a quality task with a detection of a predefined event. A quality task activated as shown by block 415 may perform some or all tasks described herein with relation to a quality task, e.g., select interactions for evaluation etc. As shown by block 420, interactions may be selected for evaluation. As described herein, any applicable criteria may be used for selecting interactions for evaluation, e.g., a breaching of a KPI, call type (for example, support, sales, per product, campaign, or other types), predefined words or terms used during an interaction (that may be detected by word spotting techniques), duration of a call, screen events, e.g., events associated with a screen used by the relevant agent, seniority of the agent associated with an interaction, historical performance of the agent, a quota related to the agent or the quality manager etc.

Unlike selecting calls randomly as done according to prior art, any applicable business objectives may be used as a criterion for selecting calls for evaluation. For example, a business objective may be promoting a specific campaign, reducing staff, increasing upsells related to specific products etc. Accordingly, interactions selected for evaluation may be those specifically related to a specific business objective. In some embodiments, metadata related to the interactions may be used in the selection process. For example, metadata stored in data management unit 130 as shown in FIG. 1 may be examined by management unit 145. Metadata stored in management unit 130 may comprise various information such as call duration, relation of an interaction to a specific campaign, agent, product etc. As known in the art, any applicable information may be stored as metadata and accordingly used in a selection process as described herein.

As shown by block 425, selected interactions may be provided to a quality manager for evaluation. As described herein, selected interactions may be provided with an associated evaluation form that may be used by the quality manger during evaluation. For example, the evaluation form may guide the evaluator through parameters that need to be addressed as part of the evaluation. As shown by block 430, the evaluation process may be monitored. For example, the number of interactions evaluated may be determined and compared to a predefined quota of evaluations to be performed by a specific quality manager or other evaluator. Results of evaluations may be recorded as part of the monitoring shown by block 430. Any other relevant parameters or information may be monitored and/or recorded during or after an evaluation is performed.

As shown by block 435, indications and/or reports may be generated. Indications generated as shown by block 435 may be related to the evaluated interactions, to the person performing the evaluations, to the agents related to the evaluated interactions or to any applicable aspect of the evaluated interactions. For example, a score below a predefined level associated with more than a predefined number of calls may trigger an indication or alarm to be provided to a manager. Failing of a quality manager to meet his monthly or other quota of evaluations may cause an indication to be provided to his superiors. Any applicable threshold may be defined and associated with an alarm, indication or report. Indications described herein may be provided in any applicable way, e.g., by an electronic mail, paging system, phone, fax, popup on a computing device's screen or any other suitable means.

Reports provided as described herein may provide business insights that may be impossible according to prior art. for example, based on a selection of interactions for evaluation as described herein a campaign's progress may be closely monitored and managed. Any business aspect may be translated into a set of criteria used for selecting interactions for evaluation and accordingly, such business objective may be monitored by ensuring that a predefined quota of related interactions are evaluated. For example, a business objective may include improving service provided by new agents. Accordingly, a selection criteria may be defined such that a predefined evaluation quota of interactions related to new agents is met. Likewise, promoting a new product or service may be reflected in the parameters used for defining a quality plan or quality task as described herein and thus enable monitoring and managing a progress of such promotion.

As shown by block 440, an action may be performed. For example, detecting that more than a predefined number of interactions associated with a specific agent have been associated with a score below a predefined level or value may cause embodiments of the invention to launch a coaching package for the agent. Such coaching package may include any training or other material that may be used for increasing relevant skills of the agent. Other exemplary actions that may be automatically performed based on a result or outcome of an evaluation may be scheduling a meeting of an evaluated agent with a manager or superior, updating an agents record, e.g., recording high scores to be used when the agent is being appraised.

According to some embodiments of the invention, a KPI definition may be dynamic. A dynamic KPI may be dynamically defined and/or modified according to various aspects, parameters, context or definitions. For example, rather than defining a specific set of parameters or thresholds, a KPI may be defined to yield a predefined distribution of scores, results or breaching. For example, a KPI may be defined to produce a predefined breaching rate, e.g., no more than 20% of calls are to breach the KPI. Accordingly, such KPI may be modified if more than 20% of the calls breach it. For example, an AHT related KPI may be defined such that no more than 15% of processed calls will breach it, e.g., be longer than a predefined AHT, for example, five minutes. If more than the predefined 15% of processed calls breach such KPI, namely, have a holding time of more than five minutes than the AHT related to such KPI may be automatically modified by a predefined step. For example, the AHT associated with the KPI may be changed to six minutes. Accordingly, the number or percentage of calls breaching the KPI may be reduced to the desired 15%. Such automatic modification of a KPI may be one of the actions performed as shown by block 440. For example, KPI unit 155 may be provided with results from a selection process and/or an evaluation process and may modify a KPI's definition as described herein.

According to some embodiments of the invention, a KPI definition may be modified according to results or outcome of an evaluation process. For example, if more than a predefined number or percentage of evaluated interactions are given a score lower than a predefined value then a related KPI may be modified. For example, due to efficiency considerations, longer calls may be associated with a lower score than shorter calls. A KPI may include a call duration parameter and accordingly, calls may be selected for evaluation based, at least in part, on their respective duration. Accordingly, detecting that a (possibly too) high volume of calls are selected for evaluation due to their duration or length a related KPI may be automatically modified such the less calls are selected due to their length or duration in time. For example, a breaching point of a related KPI may be moved from a duration of six (6) minutes to seven (7) minutes, accordingly, less calls will be selected for evaluation as less calls will breach the modified KPI. It will be understood that any information collected or generated as described herein may be used to cause an automatic modification of a KPI as described herein. Any other applicable aspects may be automatically modified as described herein with relation to KPIs. For example, detecting that too many calls are being selected for evaluation may cause management unit 145 to modify, e.g., reduce, the list of agents to be evaluated or modify a quota as described herein.

Figure 5:
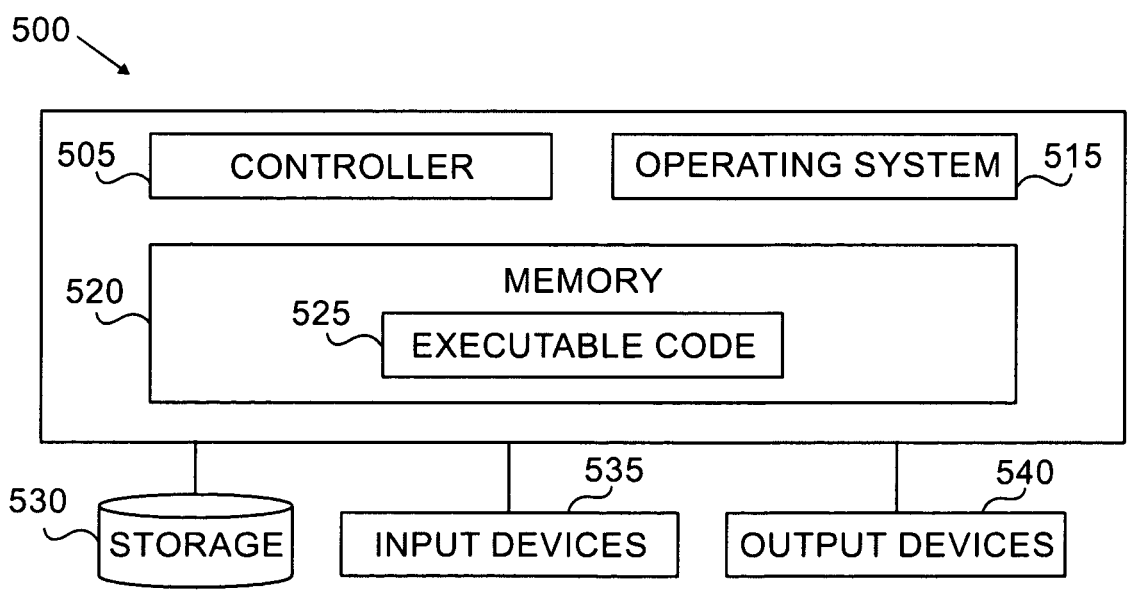
FIG. 5 shows a high level block diagram of an exemplary computing device according to embodiments of the present invention.

Reference is made to FIG. 5, showing high level block diagram of an exemplary computing device according to embodiments of the present invention. Computing device 500 may include a controller 505 that may be, for example, a central processing unit processor (CPU), a chip or any suitable computing or computational device, an operating system 515, a memory 520, a storage 530, an input device 535 and an output device 540.

Operating system may be or may include any code segment designed and/or configured to perform tasks involving coordination, scheduling, arbitration, supervising, controlling or otherwise managing operation of computing device 500, for example, scheduling execution of programs. Operating system 515 may be a commercial operating system. Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 may be or may include a plurality of, possibly different memory units.

Executable code 525 may be any executable code, e.g., an application, a program, a process, task or script. Executable code 525 may be executed by controller 505 possibly under control of operating system 515. Storage 530 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Input devices 535 may be or may include a mouse, a keyboard, a touch screen or pad or any suitable input device. It will be recognized that any suitable number of input devices may be operatively connected to computing device 500 as shown by block 535. Output devices 540 may include one or more displays, speakers and/or any other suitable output devices. It will be recognized that any suitable number of output devices may be operatively connected to computing device 500 as shown by block 540. Any applicable input/output (I/O) devices may be connected to computing device 500 as shown by blocks 535 and 540. For example, a network interface card (NIC), a printer or facsimile machine, a universal serial bus (USB) device or external hard drive may be included in input devices 535 and/or output devices 540. According to embodiments of the invention, quality management system 140, data management unit 130 and/or data resources 110 may comprise all or some of the components comprised in computing device 500 as shown and described herein.

Embodiments of the invention may include an article such as a computer or processor readable medium, or a computer or processor storage medium, such as for example a memory, a disk drive, or a USB flash memory, encoding, including or storing instructions, e.g., computer-executable instructions such as executable code 525, which when executed by a processor or controller, carry out methods disclosed herein. For example, a storage medium such as memory 520, computer-executable instructions such as executable code 525 and a controller such as controller 505. Some embodiments may be provided in a computer program product that may include a machine-readable medium, stored thereon instructions, which may be used to program a computer, or other programmable devices, to perform methods as disclosed above.

Embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components. In some embodiments, such system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer-implemented method for performing a quality evaluation, the method comprising:
   accepting a definition of a quality task associated with a predefined evaluation form, wherein the definition of the quality task is based on quality task parameters selected by a user on a graphical user interface;
   activating the quality task upon detecting breaching of a predefined key performance indicator (KPI);
   selecting from a plurality of interaction recordings one or more selected interaction recordings for evaluations, the one or more interactions recordings selected with relation to said quality task;
   associating the selected interaction recordings with the predefined evaluation form;
   displaying a graphical representation of the one or more interaction recordings and the evaluation form, wherein the evaluation form is used to evaluate the one or more interaction recordings;
   receiving evaluation results of the one or more selected interaction recordings; and
   performing at least one predefined action based on the results.

2. The method of claim 1, wherein selecting is based on least one of: an agent identification, an interaction duration, an interaction result, an average holding time (AHT), an audio analysis result, a customer satisfaction indicator, a time of the interaction, a metadata associated with an interaction, a KPI and a quality supervisor.

3. The method of claim 1 further comprising:
   categorizing the plurality of interaction recordings into predefined categories; and applying a predefined set of key performance indicators to at least one of the predefined categories.

4. The method of claim 1, wherein the quality task defines at least one call type, at least one KPI and at least one agent.

5. The method of claim 1, wherein the one or more selected interaction recordings are selected according to a predefined quota, said quota related to a number of evaluations to be performed by a quality supervisor during a predefined period of time.

6. The method of claim 5, wherein said quota defines a maximum number of interaction recordings related to a specific agent in a call center.

7. The method of claim 1, wherein selecting is based on a quality plan, said quality plan defining at least a quality plan name, an evaluation quota related to at least one quality manager, at least one agent to be evaluated and at least one quality task.

8. The method of claim 7, wherein said quality task defines a load of said quality task, said load is determined relative to a total load of a related quality plan, a time period related to selected interactions, a time for completing an evaluation of selected interactions, an association of at least one agent with at least one quality manager and an agent prioritization parameter.

9. The method of claim 8, wherein said prioritization parameter is at least one of an agent seniority prioritization parameter and an agent historical prioritization parameter.

10. The method of claim 7, wherein said quality task defines at least one event to cause at least one notification to a user, said event selected from the list consisting of: an evaluation due date expiration, an evaluation result exceeding a predefined threshold and an initiation of a related quality task.

11. The method of claim 1, wherein the quality task is to compensate for other quality task, if the other quality task failings to select its quota of interactions.

12. The method of claim 1, wherein a first interaction selected for evaluation is to be automatically replaced by a second interaction having a greater severity of breaching a KPI.

13. The method of claim 1, comprising automatically modifying a definition of a KPI according evaluation results.

14. The method of claim 1, wherein selecting the one or more selected interaction recordings for evaluation is based on a seniority of associated agents.

15. The method of claim 7, wherein the quality plan is associated to a plurality of quality tasks.

16. The method of claim 15, wherein each of the plurality of the quality tasks is assigned a percentage of an overall load of the quality plan.

* * * * *